UNITED STATES PATENT OFFICE.

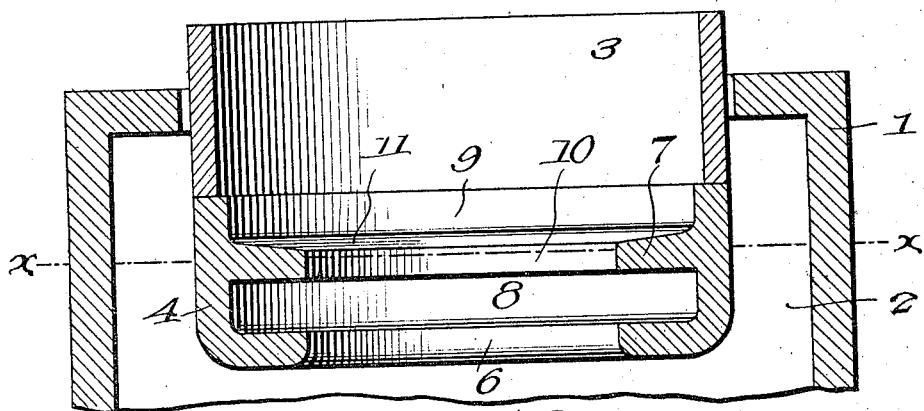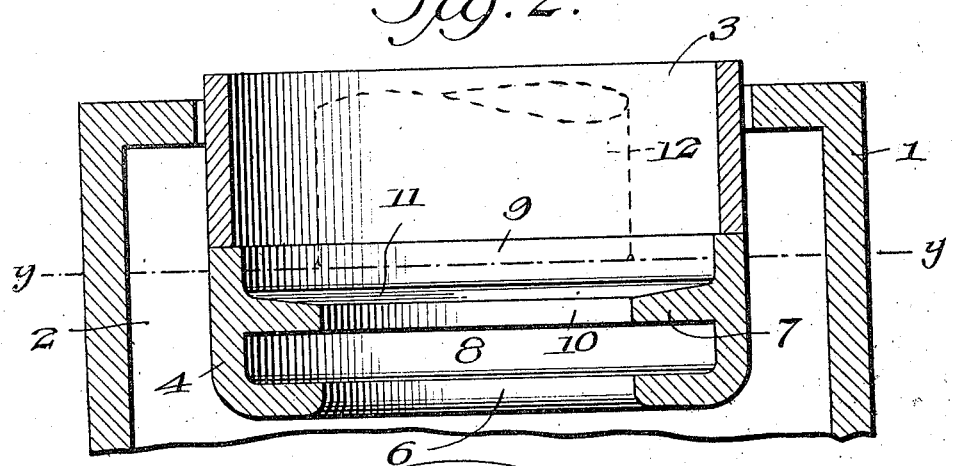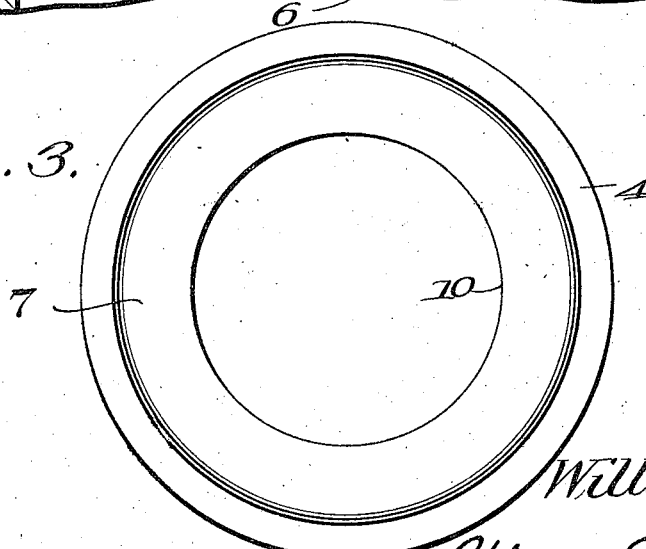

WILLIAM WESTBURY, OF OKMULGEE, OKLAHOMA.

DRAWING-RING.

1,179,251.     Specification of Letters Patent.     Patented Apr. 11, 1916.

Application filed January 26, 1916. Serial No. 74,468.

*To all whom it may concern:*

Be it known that I, WILLIAM WESTBURY, a citizen of the United States, residing at Okmulgee, in the county of Okmulgee and State of Oklahoma, have invented new and useful Improvements in Drawing-Rings, of which the following is a specification.

This invention relates to improvements in drawing rings of the type employed in glass drawing apparatus, for confining a portion of the molten glass from which the cylinder is directly drawn, and particularly to drawing rings of the floating type which are movable over the surface of the glass, so that after the cylinder has been drawn the ring may be moved back into the melting tank and the aftermath subjected to a proper temperature for remelting it and allowing it to drain back into the body of molten glass in the tank. In drawing glass from rings of this character, certain objections are found which result in the drawing of imperfect cylinders. Very often, owing to the fact that the glass remains at a fixed level in the ring, chilling of the glass occurs around the inner edge of the ring from the atmosphere and from the water jacket or shield used to hold the ring in place. This glass, being constantly exposed to chilling and reheating, becomes "denatured" and causes what is known as a smear, *i. e.*, heavy lines in the glass, thereby impairing its quality. Furthermore, in the use of ordinary rings having a fixed or constant glass level, the cylinder tends to float to one side or the other of the ring, whichever happens to be the hottest, until one wall of the cylinder comes in contact with a wall of the ring, causing the production of thick and thin glass or uneven thickness of the walls of the cylinder.

The object of my invention is to provide a drawing ring of novel construction which overcomes these objections in a simple, reliable and efficient manner, and by means of which a fresh and pure charge of glass may be presented for each draw and the cylinder maintained in a fixed position so that clear glass cylinders of uniform thickness and of first quality glass may be constantly drawn.

The invention consists of the features of construction, combination and arrangement of parts herein fully described and claimed, reference being had to the accompanying drawing in which:—

Figure 1 is a vertical section through a glass reservoir, shield and a drawing ring embodying my invention, showing the normal position of the ring. Fig. 2 is a similar view showing the position of the ring during the production of a cylinder. Fig. 3 is a top plan view of the ring.

Referring to the drawing, 1 designates a dog-house or other receptacle containing the main charge 2 of molten glass from which the cylinders are to be drawn, and 3 designates a water jacket or shield such as is commonly employed in the art for protecting the drawing ring, surface of the glass and the lower portion of the cylinder to a greater or less extent from the heat of tank or furnace and chilling effects of the air. The water jacket or shield, however, being cooler than the ring, very commonly causes a reduction of temperature whereby the ring and the glass contained therein are chilled as hereinbefore set forth. Arranged within the receptacle 1 is a drawing ring 4 constructed in accordance with my invention, whereby the objections aforementioned to the use of ordinary drawing rings are prevented, as hereinafter fully described. This ring is constructed of fire clay or other suitable material of less specific gravity than the glass and is adapted to float upon the surface of the glass so as to be transferred from the forehearth, doghouse or drawing station to the body of the furnace tank, and vice versa, so that the ring may be heated after a draw to melt the aftermath and subject the melted glass draining from the ring to a reheating and purifying process. The ring is adapted to be employed in connection with the usual protecting guard or shield 3 consisting of a tubular body of suitable material which may be water-jacketed, if desired.

The ring 4 is of a proper depth and diameter and is provided in its bottom with a filling and drain opening 6 and at a point between its bottom and top with an annular partition 7 in the form of an inwardly projecting flange separating the pot into lower and upper chambers 8 and 9 and providing an opening or passage 10 between said chambers which is preferably of the same diameter as the opening 6. The upper surface of the flange or partition 7 inclines or slopes, as shown at 11, from its point of connection with the side wall of the ring to the opening 10, and thus provides a sloping shelf for the drainage off of the melted aftermath and at the same time defines a normal floating level of the ring in the body of glass. This level is indicated by the line x—x which lies slightly below the upper edge of the wall of the opening 10 or lowermost portion of the sloping shelf, so that normally the glass lies below the upper chamber 9 and within the lower chamber 8, but in the operation of drawing a cylinder the ring is depressed so as to bring the level of the body of glass up to the line y—y, so that the glass flows from the chamber 8 and through the opening 10 into the chamber 9 to provide a segregated portion of molten glass from which the cylinder is directly drawn.

In drawing the cylinder the guard or shield 3 is placed in position so as to rest upon the rim of the ring and said guard or shield is forced down to depress the ring to the degree stated, whereupon the drawing tool is brought into action to draw the cylinder from the glass contained initially in the chamber 9 and later from the supply in the chamber 8. In drawing out the cylinder 12, indicated in dotted lines, to a portion of its length all or the greater portion of the glass contained in the upper chamber 9 is used before it becomes objectionably chilled from the atmosphere and shield 5, and as the flange 7 overhangs and protects the underlying body of glass in the chamber 8 from the chilling effects of the air and the shield the remainder of the cylinder will be drawn from glass which is maintained at a high temperature and highly liquid state, whereby a cylinder free from defects will be produced. The opening 10 is designed to be of a diameter conforming substantially to the diameter of the cylinder to be drawn, and therefore in expanding the cylinder by means of the admitted air at the beginning of the draw care is taken to distend the cylinder until its walls aline with the walls of the opening 10, so that the glass will be drawn from a supply of pure and highly heated glass flowing up through said opening, whereby a uniform temperature will be maintained to keep the walls of the cylinder of uniform thickness. The ring is thus kept at all times at substantially the same degree of temperature, whereby its tendency to float out of drawing position will be avoided and whereby the cylinder will also be held from relative lateral movement to prevent it from coming in contact with the side walls of the ring and to maintain an even thickness of its own walls as it is being drawn. It will of course be understood that more or less glass may remain in the chamber 9 at the end of the draw, and that this residuum glass, commonly known as the aftermath, is necessarily chilled to a lower temperature than the body of glass in the tank and forehearth and requires reheating and purification before it can be used again. To this end, the guard ring is elevated after the cylinder is drawn and severed so as to allow the drawing ring to float to its normal level, leaving the chilled glass remaining in the chamber 9, and this drawing ring is then pushed back by means of a suitable tool into the body of the tank and another drawing ring pulled from the tank into the drawing station for the production of the succeeding cylinder. The ring pushed back into the tank will thus be subjected to the higher temperature in the tank and the aftermath contained in the chamber 9 will accordingly be melted and will flow down the slopping shelf 11 and drain back through the opening 10 into the chamber 8, from which it will pass into the tank to mingle with the glass therein and thus become reheated and regenerated or purified. It will therefore be evident that by the use of my improved drawing ring the objections noted with respect to ordinary drawing rings are overcome in a simple, reliable and efficient manner, and provision made for securing a supply of pure and highly heated glass for use at each drawing operation.

I claim:—

1. A drawing ring comprising a body having a bottom opening and an internal horizontal flange arranged at a point between the top and bottom of said ring and having its upper surface arranged at a point just above the normal float level of the ring and forming a sloping shelf inclining toward the opening formed thereby.

2. A drawing ring comprising a body having an opening in the bottom thereof and having a horizontal transverse flange therein disposed at a point between the top and bottom of the ring and having its upper surface arranged at a point just above the normal float level of the ring.

3. A drawing ring comprising a floatable body having an inlet opening in the bottom thereof of less diameter than said bottom and having an annular horizontal flange therein at a point between its top and bottom, said flange forming an opening of substantially the same diameter as the inlet opening in the bottom and connecting the upper and lower portions of the ring, said flange having its upper surface arranged just above the normal float level of the ring and sloping inwardly toward the opening formed thereby.

In testimony whereof I affix my signature in presence of two witnesses.

WILLIAM WESTBURY.

Witnesses:
  A. L. NIXON,
  J. T. PANCOAST.